United States Patent [19]

Fahringer

[11] Patent Number: 4,817,330
[45] Date of Patent: Apr. 4, 1989

[54] INSECT CAPTURING DEVICE

[76] Inventor: Stephen A. Fahringer, 4695 Bennett Dr., Las Vegas, Nev. 89121

[21] Appl. No.: 104,957

[22] Filed: Oct. 6, 1987

[51] Int. Cl.$^4$ .............................................. A01M 5/00
[52] U.S. Cl. ...................................... 43/133; 43/136; 43/139
[58] Field of Search ...................... 43/139, 132.1, 136, 43/135, 138, 133

[56] References Cited

U.S. PATENT DOCUMENTS

| 289,997 | 12/1883 | DeLuze | 43/139 |
| 454,720 | 6/1891 | Dexter | 43/139 |
| 1,141,039 | 5/1915 | Cox | 43/139 |
| 1,308,497 | 7/1919 | Jolly | 43/139 |
| 1,517,131 | 11/1924 | Thompson | 43/139 |
| 1,797,557 | 3/1931 | Stine et al. | 43/139 |
| 2,992,770 | 7/1961 | Keiser | 43/139 |
| 3,196,577 | 7/1965 | Plunkett | 43/139 |
| 3,231,997 | 2/1966 | Shugarman | 43/139 |
| 3,965,608 | 6/1976 | Schuman | 43/139 |
| 4,488,331 | 12/1984 | Ward | 43/139 |

FOREIGN PATENT DOCUMENTS

R948111  9/1955  Fed. Rep. of Germany ........ 43/139

Primary Examiner—Nicholas P. Godici
Assistant Examiner—Karen Skillman
Attorney, Agent, or Firm—Dean P. Edmundson

[57] ABSTRACT

A hand-held, manually-operable, portable device is described for capturing insects. The device includes (a) a bellows for creating a vacuum when squeezed, (b) a trap chamber having a nozzle opening to the atmosphere, the trap chamber including an adhesive interior surface, (c) a conduit connected between the bellows and the trap chamber, (d) a screen in the conduit, (e) a valve in the conduit which is movable between open and closed positions, and (f) a trigger to actuate the valve and cause it to open, allowing air to rush through the nozzle and draw an insect into the trap chamber.

9 Claims, 1 Drawing Sheet

INSECT CAPTURING DEVICE

FIELD OF THE INVENTION

This invention relates to devices for capturing insects of various types. More particularly, this invention relates to portable, hand-held devices for capturing insects.

BACKGROUND OF THE INVENTION

The presence of insects in the home, garage, office, etc. has always been regarded as a nuisance. Although it is possible to kill such insects by swatting, this is not always possible. It can also lead to broken or damaged items (e.g., windows, lamp shades, etc.) if not carefully done. Then it is still necessary to dispose of the dead insect.

Various devices have previously been described for use in capturing or exterminating insects. See, for example, U.S. Pat. Nos. 289,997; 1,517,131; 3,196,577; and 3,965,608. Some of such devices capture the insect live, while some devices actually exterminate the insect. Some of the devices must attract the insect in some manner (e.g., with a light beam). However, not all insects can be attracted in this manner. Also, many of the prior devices require the use of batteries or other power supplies; other devices are complicated in design and cumbersome in use. U.S. Pat. No. 3,231,997 describes a suction gun for capturing small aquatic life, but it does not appear to be suitable for capturing insects in the atmosphere.

There has not heretofore been provided a hand-held, portable device for capturing insects which is manually operated, economical to manufacture, and which includes a disposable trap.

SUMMARY OF THE PRESENT INVENTION

In accordance with the present invention there is provided a hand-held, portable, manually operated, manually powered device for capturing insects. The device is economical to manufacture, easy to use, and very effective for capturing and disposing of insects in the home, garage, office, etc. It is clean and quiet and is useful in capturing any type of insect found indoors without creating a mess and without having to actually touch the insect at any time.

In a preferred embodiment the device comprises:

(a) bellows adapted to create a vacuum when squeezed or compressed;
(b) a trap chamber having a nozzle opening to the atmosphere; the chamber including an interior adhesive surface which is normally tacky;
(c) a conduit connecting between the bellows and the trap chamber;
(d) one or more screens in the conduit or rear portion of the trap chamber;
(e) a valve in the conduit which is movable between closed and open positions;
(f) a trigger adapted to move the valve from closed to an open position; and
(g) a handle attached to the conduit for supporting the device.

The trap chamber is detachably mounted to the conduit so that it can be removed and disposed of after capturing insects.

After a vacuum is created by squeezing the air out of the bellows, the valve is then closed. In preferred embodiments the valve will close automatically after air is squeezed out of the bellows. The nozzle on the trap can then be positioned next to the insect to be captured. When the trigger is actuated to open the valve in the conduit the atmospheric air rushes into the nozzle and proceeds toward the expanding bellows. The insect is drawn into the trap chamber by the air. When the insect contacts a tacky surface in the interior of the trap chamber it becomes adhered to the tacky surface and cannot leave the trap. If desired, an insecticide may also be included in the trap chamber.

The device may be re-used with the same trap chamber, if desired, so long as a tacky surface is present to immobilize the captured insect. After any use of the device the trap chamber may be detached and discarded, with the immobilized insect(s) inside.

The trap chamber can be made of inexpensive materials such as cardboard, paper, plastic, etc. The conduit and handle can be made of low-cost durable materials such as plastic, for example. The bellows may be a hollow rubber bulb with a spring or other bias means inside, if desired, to assist in expanding the bellows rapidly when required Other advantages of the device of this invention will be apparent from the following description and the appended drawings.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
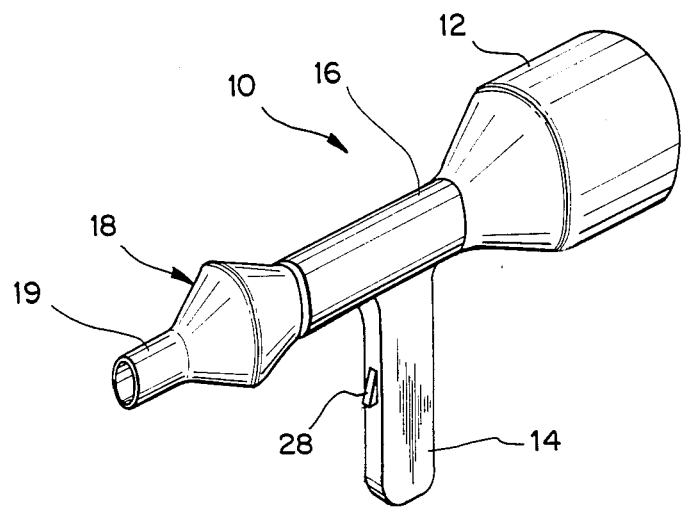
FIG. 1 is a perspective view of one embodiment of the device of the invention.
Figure 2:
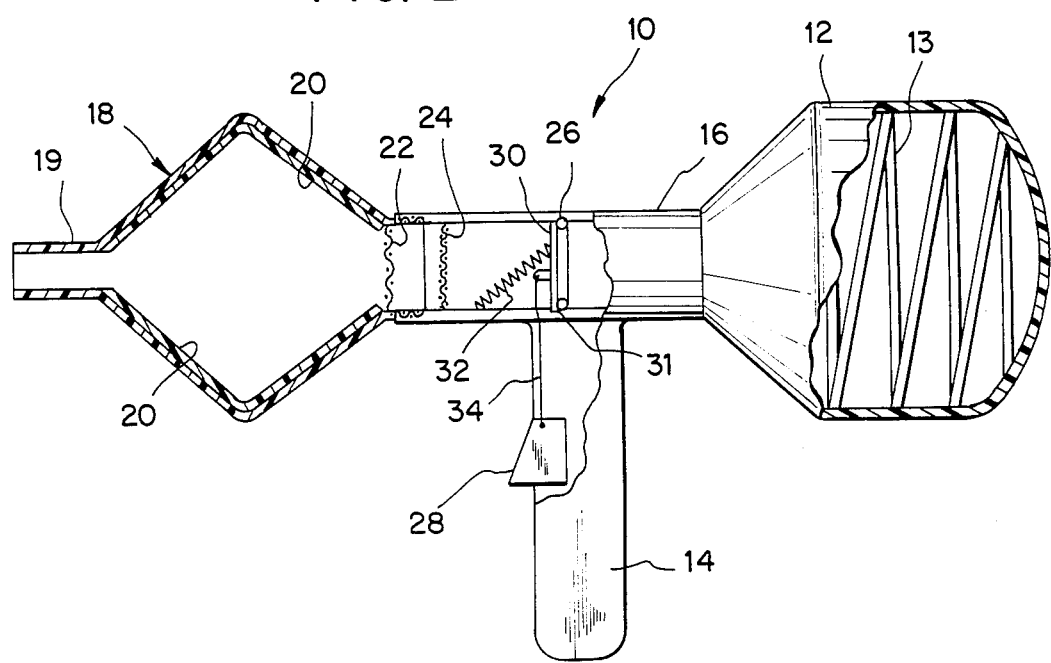
FIG. 2 is a partially cut-away, side elevational view of the device of FIG. 1.

In the drawings there is illustrated one embodiment of insect capturing device 10 which is especially useful in capturing and trapping insects (e.g., around the home, garage, etc.) and then disposing of such insects. The capturing device is manually operable so that it may be used anywhere. No batteries or electricity are required.

The capturing device 10 includes a bellows 12 (e.g., a hollow rubber bulb) which may be simply squeezed to expel the air inside of it to create a vacuum source. The bellows 12 is operably connected to one end of a hollow tubular conduit 16. At the opposite end of conduit 16 there is attached a trap chamber 18. Handle 14 is attached to the conduit 16 for holding and supporting the device by the user.

The trap chamber 18 includes an elongated nozzle portion 19 which is open to the atmosphere. The nozzle portion communicates with the interior of the trap chamber 18 which in turn communicates with the conduit 16. Of course, the conduit also communicates with the bellows 12.

Some or all of the interior surfaces 20 of the trap 18 include a tacky glue or adhesive (e.g., a pressure-sensitive adhesive). When an insect is drawn through the nozzle and into the trap chamber by the vacuum, the insect becomes caught upon contact with the tacky interior surface. If desired, a conventional insecticide may also be included in the trap chamber to exterminate the insect.

The trap chamber 18 is detachably mounted on the end of conduit 16 so that after it has been used it may be simply detached from the conduit and thrown away. For example, the trap chamber and the end of the conduit may both be threaded so that the trap chamber can be threadably secured to the conduit. Alternatively, the trap chamber may be detachably mounted on the conduit by means of a conventional twist-lock arrangement. As another alternative, the trap chamber may be detachably mounted on the conduit by a frictional sliding engagement.

Preferably there is a screen member 22 near the rear portion of the trap chamber adjacent the point where the trap chamber attaches to the conduit. There may also be a screen member 24 extending traversely across the conduit, as illustrated. The screen members allow air to pass therethrough without appreciable resistance while at the same time preventing an insect or large clumps of dirt from leaving the trap chamber and entering the bellows.

A valve is included in the conduit which is movable from a closed position to an open position. Thus, when the bellows is squeezed to remove the air from the bellows, the air will open the valve. After the bellows is collapsed, a spring closes the valve again automatically. Then when it is desired to draw air (and an insect) into the trap chamber, the valve is simply opened. When the bellows expands it draws air into the trap chamber.

In the embodiment shown in the drawings, the butterfly valve 30 is hinged at one side 31 so that it can pivot between an open and a closed position. When valve 30 rests against O-ring 26 mounted in conduit 16 the valve is closed. Air pressure (i.e. atmospheric pressure) pushes against the valve 30 when the bellows 12 attempts to expand. Spring 32 also urges the valve against the O-ring 26. Spring 32 will close the valve 30 automatically after the bellows 12 has been collapsed.

Trigger 28 is mounted on handle 14 and is pivotable. Rod 34 is connected between the trigger and the valve 30 in a manner such that pulling the trigger causes the valve 30 to be opened, thereby allowing air to rush into nozzle 19, chamber 18, conduit 16 and finally bellows 12.

The bellows 12 can be a hollow rubber bulb, for example. If desired, it may include a spring 13 or other bias means to urge the bellows outwardly after it has been compressed. This increases the speed at which the bellows will expand when the valve is opened, and therefore increases the rate at which air rushes into the nozzle.

Thus, the device can be used repeatedly, if necessary or desirable, by simply squeezing the bellows to create a new vacuum source between each use. Then actuation of the trigger causes the valve to open and air to be drawn inwardly at high velocity.

Other modifications and variations are possible without departing from the scope of the present invention. For example, the shape of the trap chamber may vary (e.g., it may be circular, ovular, square, triangular, etc.). The tacky interior surface in the trap chamber may be on each of the interior walls or only on one of the walls, if desired. It is also possible for the tacky surface to be suspended within the trap chamber. The type of adhesive used may vary so long as it is normally permanently tacky (e.g., such as is used on conventional fly paper). Preferably the adhesive is aggressive.

The trap chamber may be composed of any desired material. For example, it may be made of cardboard, or heavy paper, or plastic, etc. Since it is intended to be disposable, the trap chamber preferably is made of inexpensive material.

Although the trigger shown in the drawings is mounted on the handle, it could instead be mounted on the conduit itself, if desired. The shape of the handle may also vary. If desired, the conduit could also serve as the handle member itself.

What is claimed is:

1. A hand-held, portable, manually operated device for capturing insects, said device comprising:
   (a) handle means for holding said device;
   (b) bellows adapted to create a vacuum when squeezed;
   (c) a trap chamber having a nozzle opening to the atmosphere, said chamber including an interior adhesive surface; wherein said adhesive is normally tacky;
   (d) conduit means connecting said bellows and said trap chamber; wherein said trap chamber is detachably mounted to said conduit means; and wherein said trap chamber is disposable;
   (e) screen means in said conduit means;
   (f) valve means in said conduit means, said valve means being movable between closed and open positions; wherein said valve means comprises a door which is pivotally mounted in said conduit means, and wherein said door is biased toward its said closed position by means of a spring;
   (g) trigger means adapted to move said valve means from said closed position to said open position;
   wherein when a vacuum exists in said bellows, and said valve is moved to said open position, air rushes through said nozzle in said trap chamber and into said bellows, whereby an insect drawn into said trap chamber through said nozzle is caught on said adhesive surface.

2. A device in accordance with claim 1, wherein said trap chamber is threadably mounted to said conduit means.

3. A device in accordance with claim 1, wherein said bellows comprises a hollow rubber bulb.

4. A device in accordance with claim 1, wherein said handle means is secured to said conduit means, and wherein said trigger means is supported by said handle means.

5. A device in accordance with claim 1, wherein said trap chamber comprises a cardboard housing whose interior surfaces are coated with pressure-sensitive adhesive.

6. A hand-held, portable, manually-operated device for capturing insects, said device comprising:
   (a) bellows adapted to create a vacuum when squeezed;
   (b) a trap chamber having a nozzle opening to the atmosphere; said chamber including an interior adhesive surface which is normally tacky wherein said trap chamber comprises a cardboard housing whose interior surfaces are coated with pressure-sensitive adhesive;
   (c) conduit means connecting said bellows and said trap chamber;
   (d) screen means in said conduit means;
   (e) valve means in said conduit means; said valve means being movable between closed and open positions; wherein said valve means comprises a door which is pivotally mounted in said conduit means, and wherein said door is biased toward its said closed position by means of a spring;

(f) trigger means adapted to move said valve means from said closed position to said open position;

(g) handle means attached to said conduit means for holding said device;

wherein said trap chamber is detachably mounted to said conduit means; wherein when a vacuum exists in said bellows and said valve is moved to said open position, air rushes through said nozzle in said trap chamber and into said bellows, whereby an insect drawn into said trap chamber through said nozzle is caught on said adhesive surface.

7. A device in accordance with claim 6, wherein said trap chamber is threadably mounted to said conduit means.

8. A device in accordance with claim 6, wherein said bellows comprises a hollow rubber bulb.

9. A device in accordance with claim 6, wherein said trap chamber further includes an insecticide.

* * * * *